April 28, 1959 P. M. YOUNG 2,884,487

CHECKING CIRCUIT

Filed Dec. 30, 1955 2 Sheets-Sheet 1

INVENTOR
PAUL M. YOUNG

BY [signature]

ATTORNEY

April 28, 1959 P. M. YOUNG 2,884,487

CHECKING CIRCUIT

Filed Dec. 30, 1955 2 Sheets-Sheet 2

INVENTOR
PAUL M. YOUNG

BY [signature]

ATTORNEY

United States Patent Office 2,884,487

Patented Apr. 28, 1959

2,884,487

CHECKING CIRCUIT

Paul M. Young, Pleasant Valley, N.Y., assignor to International Business Machines Corporation, New York, N.Y., a corporation of New York Application December 30, 1955, Serial No. 556,505

1 Claim. (Cl. 178—23)

This invention relates to a tape reading machine and more particularly to a mechanism for checking the codes in a tape being read by said machine in tape read cycles.

There is a need in the art for a mechanism for determining the correctness of codes themselves as well as the interpretation of the codes as they are read in the tape, accordingly, it is a first object of this invention to provide an improved tape code checking device.

It is a further object of this invention to provide a mechanism for checking the accuracy of the codes read by a tape reader.

It is a still further object of this invention to provide a mechanism for checking the correct operation of a tape reader.

In some operations, it is desirable to check a tape for an odd number of codes in a cycle while in still other operations, it is desirable to check a tape for an even number of codes in a cycle, and accordingly, it is a still further object of this invention to provide an improved mechanism for checking either odd or even codes in a tape reader.

Other objects of the invention will be pointed out in the following description and claims and illustrated in the accompanying drawings, which disclose, by way of example, the principle of the invention and the best mode, which has been contemplated, of applying that principle.

Briefly, this invention relates to an improved mechanism and control circuitry for use with a paper tape reader whereby each tape code is analyzed by sending a pulse through a checking network. The machine is stopped unless a proper code has been read.

Figure 1:
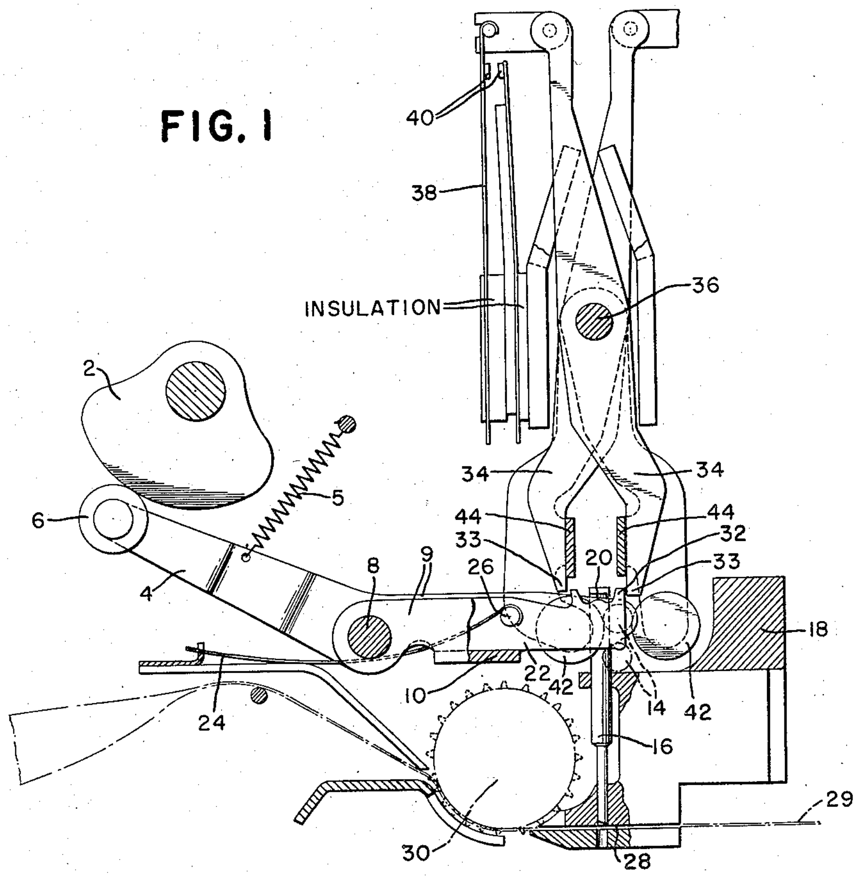
Fig. 1 is a side elevation of a tape reader.

Reference is made to Fig. 1 of the drawing which illustrates one view of a paper tape reader shown and described completely in U.S. Patent 2,637,399. Briefly, the tape reader is equipped with a cam which is cyclically driven when the tape reader is turned on. Cam 2 acts on cam arm 4, via spring 5 and cam follower 6 to rock about its support pin 8. Actually, support arm 4 comprises two parallel spaced apart actuator arms 9 interconnected for corresponding rocking motion in response to the cam imparted motion of cam arm 4 via a transverse bail 10. The arms 9 are each equipped with studs 14 which are movable in response to the operation of cam 2 from the solid line position to the dotted line position.

In the tape reader, a plurality of pins 16 (one for each tape row) are mounted for sliding movement in a reader pin support 18. Each reader pin is equipped with a notch 20 engageable with a corresponding pin driver arm

22. Each pin driver arm 22, in turn, carries a spring 24, which is hooked on the frame and passes under pin 8 to engage a pin 26 on the tape driver arm 22. With this arrangement, when bail 10 is removed, via the rocking of cam arm 4, the spring 24 acting through pin 26 will drive the read pin 16 down towards a tape read station 28. Paper tape 29 is passed in columnar steps across the tape read station 28 in response to the movement of pin wheel 30 which is cyclically driven by a cam operated mechanism, not shown. If the column of tape 29 at the read station 28 has perforations in it, then the pin 16 assigned to a particular tape row can pass through the perforation in that row. In this respect, the tension of the spring 24 is sufficient to move the pin 16 down, but not enough to perforate the tape, if a hole is not already there.

If a pin 16 enters the tape, a blocking ear 32 on the pin drive arm 22 is moved out of the path of a complementary shoulder 33 on the contact lever 34. A plurality of contact levers 34 (one for each pin 16) are supported for rocking movement about a pin 36. Each contact lever 34 is interconnected with a corresponding spring contact 38 in a manner to bias open a set of contacts 40. When a contact lever is free e.g. when blocking ear 32 is removed from shoulder 33, spring contact 38 acts to close contacts 40. On a return stroke, e.g. when the bail 10 lifts the pin drive arms 22, stud 14 is wedged between rollers 42, which acting via bails 44, restore all the contact levers to their Fig. 1 position.

In essence then, on each tape read cycle, which is measured by one revolution of the cam 2, pins 16 are spring driven down seeking apertures in the tape during one portion of a cycle, and for each pin that reads a hole in the tape, a corresponding contact 40 is closed. On the remainder of the cycle, the read pins are restored and all contacts 40 are opened.

The closing of contacts 40 in response to a pin reading a tape hole is utilized to establish a check circuit for determining the pattern of the tape holes read.

Figure 2:
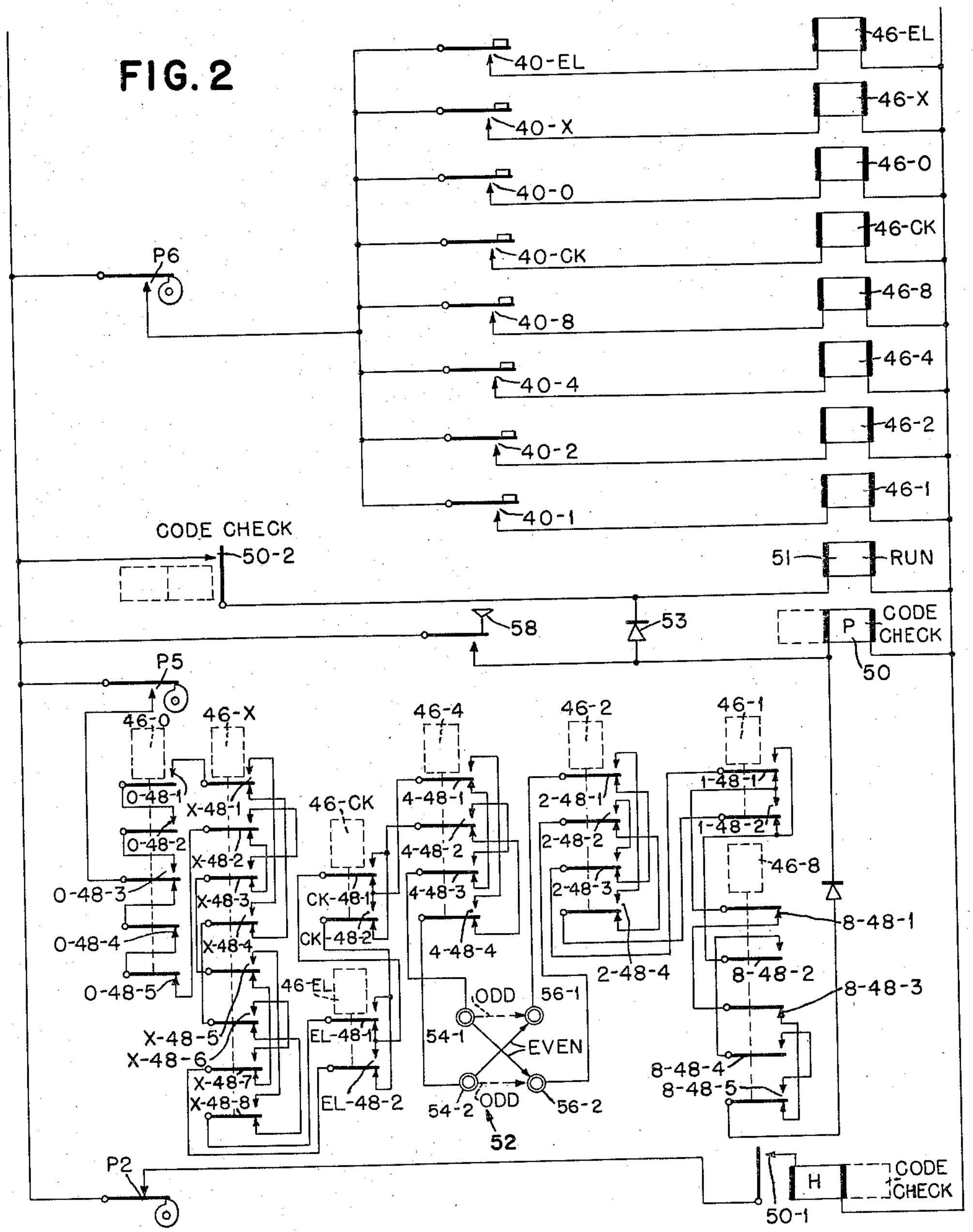
Fig. 2 is a wiring diagram representing the operation of the checking circuit of the tape reader.

Reference is now made to Fig. 2 of the drawings, wherein the electrical contacts 40 of the tape reader of Fig. 1 are shown schematically. Each electrical contact 40 is in series with a relay 46 and the contacts 40 and relays 46 bear corresponding tape code designations. Each relay 46 has plural contact points 48 which are used in a check circuit, and the tape code contacts 40, relays 46 and their contacts 48 are listed as follows:

| Tape Row Code | Contacts | Relays | Contact Points |
|---|---|---|---|
| EL | 40-EL | 46-EL | EL-48 1 through 2. |
| X | 40-X | 46-X | X-48 1 through 8. |
| 0 | 40-0 | 46-0 | 0-48 1 through 5. |
| CK | 40-CK | 46-CK | CK-48 1 through 2. |
| 8 | 40-8 | 46-8 | 8-48 1 through 5. |
| 4 | 40-4 | 46-4 | 4-48 1 through 4. |
| 2 | 40-2 | 46-2 | 2-48 1 through 4. |
| 1 | 40-1 | 46-1 | 1-48 1 through 2. |

In essence, it will be understood that for each code position read by a tape pin, a corresponding contact 40 will be closed and when a cam contact P–6 is closed, a corresponding relay 46 will be energized to close the corresponding relay contacts 48.

Figure 3:
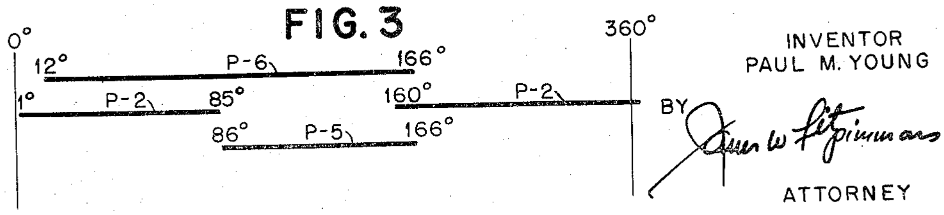
Fig. 3 is a timing chart.

The cams P2, P5, P6 are closed every tape read cycle in accordance with the sequence chart of Fig. 3, and at one portion of a cycle, a pulse is sent through contacts 48 when cam contact P5 closes. If the contacts 48 satisfy a predetermined pattern network, then code check relay 50 will be energized. In turn, the code check relay 50 has a hold circuit through its own contact point at cam P2 time.

Reference is now made to the sequence chart of Fig. 3 wherein it is shown that the pulse through the reader contact 40 during cam P6 time overlies P–5 time, while the pulse for the 50 hold coil is continuous, except during P–5 time. Accordingly, if the code check relay 50 is picked up by a pulse at cam P–5 time passing through the checking network, then it will be held up by a pulse through the P–2 time until P–5 time at next cycle. Furthermore, the check relay has a normally open contact 50–2 in a run relay 51 circuit, therefore, if a pulse is not available through the checking circuit at every P–5 time, relay **50–*h* will drop out opening 50–2** and the machine will stop.

A selection control plug 52 is provided in the contact 48 checking circuit whereby the checking circuit may be selectively changed for either odd, or even checking, i.e. for either an odd or even number of tape holes in any tape column. Selection control plug 52 comprises a pair of output hubs, odd hub 54–1 and even hub 54–2, and a pair of input hubs, even hub 56–1 and odd hub 56–2. Hub 54–1 is wired to a contact 4–48–3 while hub 54–2 is wired to contact 4–48–4. The hub 56–1 is wired to a contact 2–48–1 while hub 56–2 is wired to contact 2–48–2. With the selector control mechanism 52 cross wired, as shown in solid lines of Fig. 2, an even hole check circuit is provided, while if selector control mechanism 52 is cross wired as shown in dotted lines, an odd hole check circuit is provided.

In the operation of this mechanism, a start key 58 is closed to send a pulse to the code check relay 50–P which will be held through P–2 cam contact, normally closed, and through contact 50–1 normally open, now closed. Simultaneously, a pulse is available through rectifier 53 to energize the run relay 51, which will be held up through relay point 50–2. The reader will start operating and the first tape column will be read.

Figures 4, 5:
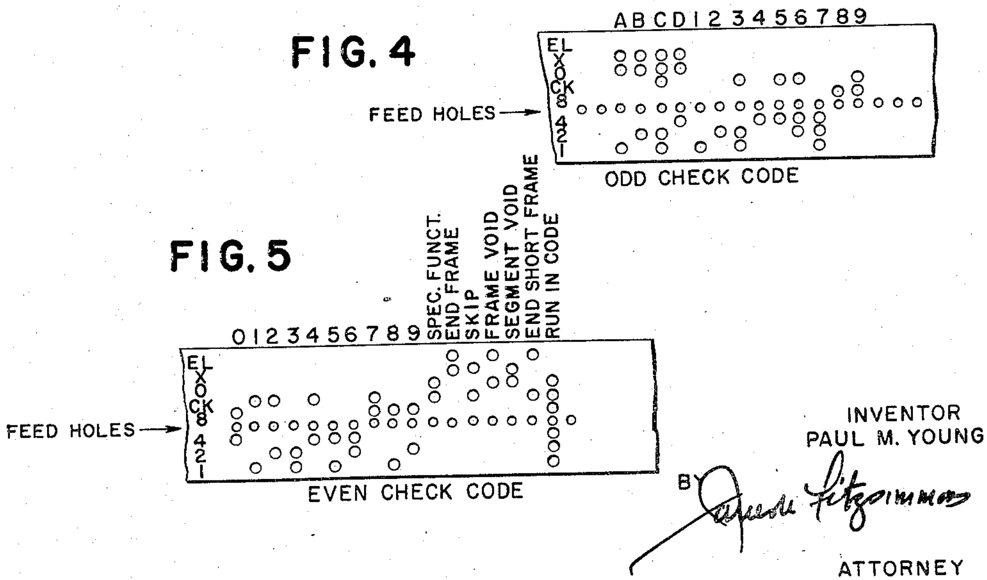
Fig. 4 is a sample of the tape with an odd number of holes in a code.
Fig. 5 is a portion of tape with an even number of holes in a code.

Reference is now made to Fig. 4, wherein each tape column has an odd number of holes. For example, the letter A is represented by the holes 1, 0 and X, therefore, with reference to Fig. 2, when that first tape column is in read station 28, the pins 16 should pass through the 1 hole, the 0 hole and the X hole, whereupon at P6 time, a pulse is to be available through 40–1 contact, 40–0 contact and 40–X contact to energize the 46–1, 46–0, 46–X relays. Then, at P–5 time, a pulse is available through contact 0–48–3 normally open, now closed; through the contact 0–48–2 normally open, now closed, through 0–48–1 normally open, now closed to the X–48–1 contact normally open, now closed; through the X–48–4 contact normally open, now closed, through the X–48–6 contact normally open, now closed; through the X–48–7 contact normally open, now closed to the EL–48–2 normally closed contact to the CK–48–2 normally closed contact to the 4–48–2 normally closed contact to the 4–48–4 normally closed contact to the hub 54–2 through the dotted wire to the 56–2 hub then up to 2–48–2 normally closed contact to the 2–48–4 normally closed contact to the 1–48–2 normally open, now closed contact, to the 8–48–1 normally closed contact, to the 8–48–3 normally closed contact, to the 8–48–5 normally closed contact to energize the code check relay 50.

It will be found that any odd number of holes which form part of the code will energize the relays 46 in such a manner as to form a path through the contacts 48 (and through dotted wires of selection control 52) to permit a pulse from the P–5 contact to energize the 50–P relay. Accordingly, the machine will continue to run as long as odd codes are read.

On the other hand if an even bit code tape (Fig. 5) is to be used in the tape reader, and assuming the tape column representing the numeral "6" is at the read station 28, then the pins 16 will read the 2 and 4 tape holes. Therefore, a pulse through P–6 will pass through 40–2 and 40–4 contacts to energize the 46–2 and 46–4 relays. Then a pulse will be available through the P–5 contact through 0–48–3 normally closed, 0–48–4 normally closed, 0–48–5 normally closed to the X–48–2 normally closed to the X–48–3 normally closed to the X–48–5 normally closed to the X–48–7 normally closed to the EL–48–2 normally closed to the CK–48–2 normally closed to the 4–48–2 normally open now closed to the 4–48–3 normally open, now closed to the hub 54–1; then through the solid line wire to hub 56–2; then to contact 2–48–2 normally open, now closed; then to the contact 2–48–3 normally open, now closed; then to the 1–48–1 normally closed to the 8–48–1 normally closed; to the 8–48–3 normally closed; to the 8–48–5 normally closed to energize the 50–P relay and thereby holding relay 50 up between the ends of cam 2 time.

With this mechanism of circuitry, it is obvious that either an odd or an even bit code can be checked to determine whether the proper number of holes have been read at the tape read station and whether or not the tape contains the proper number of holes to satisfy the code check.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

A device for detecting improperly coded character groups in coded tapes containing data in the form of character groups in columns spaced along the length of the tape, each character group having a plurality of bit positions which are selectively marked to be representative of a coded character of data, and a parity bit position, which is selectively marked in odd-parity tapes to cause the aggregate number of marks in each properly coded character group to be odd, or the converse for even-parity tapes, said bit positions being in respective rows along the length of the tape, comprising: selectively operable means for reading all the bits forming a character group during a tape column cycle; a plurality of pattern relays associated respectively with the bit positions to be read from the tape, said relays being simultaneously operable in response to marks being read in the respectively associated bit positions; code check relay means comprising a switch effective, when closed, to operate said reading means; a circuit network comprising a first maze of pattern relay contacts, associated with certain of said pattern relays, a second maze of pattern relay contacts, associated with the remaining pattern relays, and odd-even parity switching means, having four terminals, odd output, even output, odd input and even input—said first maze being arranged to provide a circuit path to said odd output terminal in response to an odd number of its associated pattern relays being energized, and to said even output terminal in response to an even number of its associated pattern relays being energized; said second maze being similarly arranged to connect the code check relay to said odd input terminal in response to an odd number of its associated pattern relays being energized, and to said even input terminal in response to an even number of its associated pattern relays being energized—whereby the operator, by setting the switching means to connect odd output to odd input and even output to even input sets the device for even parity, and by setting the switching means to connect odd terminals to even terminals sets the device for odd parity.

References Cited in the file of this patent

UNITED STATES PATENTS

| | | |
|---|---|---|
| 2,696,599 | Holbrood et al. | Dec. 7, 1954 |
| 2,713,084 | Berwin | July 12, 1955 |
| 2,714,201 | Whitehead | July 26, 1955 |
| 2,739,301 | Greenfield | Mar. 20, 1956 |
| 2,765,038 | Rhodes | Oct. 2, 1956 |